United States Patent [19]

Price

[11] 4,177,832
[45] Dec. 11, 1979

[54] INLINE BALL VALVE

[75] Inventor: Lewis H. Price, State College, Pa.

[73] Assignee: Lee Industries, Inc., Philipsburg, Pa.

[21] Appl. No.: 814,681

[22] Filed: Jul. 11, 1977

[51] Int. Cl.² .............................................. F16K 5/06
[52] U.S. Cl. ............................... 137/625.47; 251/285;
251/288; 251/315; 251/317
[58] Field of Search .................... 137/625.47; 251/315,
251/317, 285, 288; 251/288

[56] References Cited
U.S. PATENT DOCUMENTS

| | | | |
|---|---|---|---|
| 868,182 | 10/1907 | Hayden | 251/288 |
| 1,381,129 | 6/1921 | Maul | 137/625.47 |
| 2,905,197 | 9/1959 | Janes | 137/625.47 |
| 3,185,179 | 5/1965 | Harautuneian | 251/368 |
| 3,260,497 | 7/1966 | Blackford | 251/288 |
| 3,552,434 | 1/1971 | Haenky | 251/285 |
| 3,589,667 | 6/1971 | Lewis et al. | 251/315 |
| 3,614,056 | 10/1971 | Alvarey | 251/317 |
| 3,888,460 | 6/1975 | Sigmon | 251/315 |
| 3,976,102 | 8/1976 | Crocker | 137/625.47 |

Primary Examiner—William R. Cline
Assistant Examiner—H. Jay Spiegel
Attorney, Agent, or Firm—Robert D. Yeager

[57] ABSTRACT

An inline ball valve of a relatively small outer diameter, with external connecting portions formed at the ends thereof, which when open provides a passage therethrough which is free of voids. The external connecting portions for making an inline connection of the valve can be threaded, flanged, or adapted for quick clamps. A two-piece cage is provided inside of the ball valve for rotatably supporting the internal ball. The two-piece cage is formed with openings, one through each piece, which are aligned with the openings in the valve body. Each cage piece includes an annular surface, formed around the opening in a plane perpendicular to the flow passage, which is engaged by a mating annular surface on the valve body, to force the cage pieces together and into high pressure contact with the ball when the valve body is assembled. High pressure contact between the cage and the ball occurs in proximity to the annular cage surfaces. Contact pressure between the cage and the ball decreases at a distance from the annular surface. A fully confined O-ring is provided between the valve body and the cage. The internal ball is rotated by an operator stem which projects through openings formed in the cage and the valve body. The operating handle is provided with lugs which contact a stop pin, to limit rotation to 90° when the pin is located between the closer spaced sides of the lugs and 180° when the pin is located between the other sides of the lugs. The valve body is formed of two pieces which can be rapidly disassembled for easy valve cleaning. Threaded studs are provided on the main body section, extending axially, which pass through openings in the cap body section. Wing nuts are secured to the threaded studs to pull the main body section and the cap body section together, compressing the cage and the sealing O-ring. Quick clamp connector can be used in place of the threaded studs for pulling the sections together. A three way tee valve can also be built according to the teaching of the present invention. The three way valve includes a side port, aligned with an opening formed in the two piece cage. A ball formed with a passage having three openings is disposed within the cage. The ball can be positioned with the three openings aligned with the three ports. A handle and stem arrangement is provided for rotating the ball through 180°.

7 Claims, 12 Drawing Figures

INLINE BALL VALVE

BACKGROUND OF THE INVENTION

1. Field of the Invention

This invention relates to ball valves and more particularly to an inline ball valve of a relatively small outer diameter having no internal voids, when in the open position, and being particularly useful in the food, pharmaceutical and cosmetic industries.

2. Description of the Prior Art

Widely used conventional ball valves are acceptable for general industrial use but for a number of reasons are not satisfactory for food processing, pharmaceutical and cosmetic industries, where high standards of sanitation are mandatory. One reason for this problem is that a valve for general industrial use does not warrant the additional expense of fine surface finishing of valve parts which is necessary to minimize the adherence of material and to facilitate the required frequent cleaning of the valve parts. Another reason is, in the manufacture of valves for general industrial use the valve components must be useful in various valve assemblies to make possible mass production of the components and this results in using more components than necessary in the construction of a single valve. The additional components also make it more difficult to clean the valve. Also, in general use it is permissable for a valve to have sharp corners, crevices, reentrant corners, inaccessible voids and screw threads all of which multiply the cost of a cleaning operation and preclude the use of such valves for food, pharmaceutical and cosmetic industry operations.

U.S. Pat. No. 3,614,056 teaches a flush bottom tank ball valve for use as a bottom outlet on a tank which overcomes many of these objections to prior art ball valves. The ball valve disclosed in U.S. Pat. No. 3,614,056 however requires that a part of the valve be permanently attached to the bottom of the tank. This valve is also of a relatively large diameter which may preclude its use as an inline valve. Another objectionable feature of this flush bottom tank valve is, the valve body does not make flat contact with the ends of the cage parts for maximizing the force pushing the cage parts into high pressure contact with the ball. A further problem with the valve disclosed in U.S. Pat. No. 3,614,056 is that the sealing O-ring is not confined when the valve is removed from the tank bottom.

There is a need in the food, pharmaceutical and cosmetic industries for an inline ball valve of simple construction that has relatively few parts and which provides a smooth, void free passage therethrough. The parts of the valve exposed to the material being conveyed should be corrosion resistant. It is desirable to have an inline valve which is completely free from 90° internal corners and inaccessible voids, crevices, reentrant corners and internal screw threads. It is desirable that the valve be easy to disassemble by hand and be constructed for repeated disassembly and cleaning without damage. It is desirable that the valve have external threaded clamp, or flanged portions for inline use. The valve should be adaptable for use in lines which are closely spaced and run parallel with numerous other lines.

SUMMARY OF THE INVENTION

An inline ball valve, having external threads, clamps or flanges at each end which is free from internal voids and confines a plastic cage for a ball, which has a diametrical passage formed therethrough. The cage is made of a suitable heat resistant, non-corrosive, low friction plastic material such as the fluorocarbon "Teflon" or the polyimide "Vespel" that is available from DuPont. The valve cage is made in two mating sections having annular surfaces, formed perpendicular to the longitudinal flow axis, around the valve opening which extends through the cage. The valve body is made in two sections each of which has an annular surface which mates with one of the annular surfaces of the cage. The valve body is clamped together by wing nuts, which engage threaded studs extending axially from one of the body sections. Alternately the valve bodies may be clamped with quick clamp connectors. The valve body is thus clamped together by a plurality of wing nuts, or quick clamps which may be manually loosened for separation of the body sections to permit full access to the cage and ball. The disclosed valve construction permits quick and complete dismantling of the valve for cleaning purposes.

Portions of the cage outside of the annular area are tapered and aligned with tapered portions of the valve body. As the valve is assembled, the annular areas of the valve body engage the annular areas of the cage and supply a longitudinal compression to the two piece valve cage. This longitudinal compression pushes the valve cage into high pressure engagement with the ball in proximity to the annular surfaces which surround the port openings through the valve body.

By virtue of the mating annular surfaces at the opposite ends of the cage, the longitudinal compression of the cage results in sealing compression of the wall of the cage, across its thickness, at the two ends of the cage. Longitudinal compression of the cage further results in a highly efficient radially inward sealing pressure by the cage against the periphery of the ball, at the end zones adjacent to the valve ports. When the cage is compressed, a slight clearance may be provided between the cage and the ball in a zone separated from the area where the ports extend in proximity to the ball. Thus, the sealing pressure created by the longitudinal compression of the cage is concentrated at the two end zones of the ball, resulting in high unit sealing pressure in these two zones to cause the plastic cage to conform to minute irregularities in the periphery of the ball. This increased sealing effectiveness is achieved without a corresponding increase in frictional resistance to rotation of the ball, since sealing effectiveness increases with increase in unit pressure but frictional resistance is not proportionally effected.

The disclosed ball valve provides a sealing ring which embraces the cage where the two sections of the valve body meet. The sealing ring is located on a tapered portion of the cage and is fully contained at all times. The sealing ring serves not only to form a seal between the valve body and the cage but also serves as a seal between the two sections of the valve body.

The plastic cage is made into two pieces for easy removal. The parting line between the two pieces is concentric with the aligned two valve ports and equal distance from where the two ports extend to the ball. The mating edge of the two pieces of the cage have a cutout formed therein to clear a radially extending operating stem. The operating stem is interlocked with the ball and is connected at a position exterior to this valve body, to an operating handle. The operating handle has a pair of lugs formed thereon which engage a stop and permit either 90° rotation or 180° rotation, with respect to the properly selected stop pin. The operating handle is formed in one piece and is secured to the radially extending operating stem by a wing nut.

The operating stem which is insertable from the interior of the valve body has an enlargement on its inner end which cooperates with a nut on its outer end to compress a pair of plastic rings which not only provide a seal around the operating stem where it passes through the valve body, but also serves as a bearing for the operating stem. The operating stem has a generally square portion formed on a part of the stem which extends from the valve body. The operating handle engages both the nut and the upper square stem portion so that the handle serves the additional purpose of interlocking the nut with the stem to prevent loosening of the nut during operation of the valve.

The disclosed valve can also be made as a three way tee valve having two end ports and a side port. The two piece plastic cage is similar to the cage for a two way valve, but in addition, the mating edges of the two pieces of the cage have an additional cutout formed therein for the side port. The ball is formed with a passage having three openings. The ball is positionable at a first position, wherein the three ports and the three ball openings are aligned, and a second position, wherein they are not aligned. The cage fits snugly around the ball in the area of the side port to eliminate any voids. A stop pin disposed on the body of the valve permits 180° rotation of the operating handle.

It is an object of this invention to teach an inline ball valve which when in the open position provides a passage having no internal crevices or voids.

It is a further object of this invention to teach an inline ball valve with a smooth uniform passage therethrough, having a fully contained sealing means, and being constructed for complete removal as a unit from a product line.

It is yet a further object to teach an inline ball valve having few parts which can be rapidly disassembled by hand and which is usable in the food, pharmaceutical and cosmetic industries.

It is still a further object of this invention to teach an inline three way tee valve having no internal void which is suitable for use in the food, pharmaceutical and cosmetic industries.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Referring now to the drawings there is shown a ball valve 10 constructed in accordance with the teaching of the present invention. Ball valve 10 has a housing formed from two sections 12 and 14. The main body section 14 provides a cavity 26 within which a positionable ball 13 is disposed. The inlet port or cap section 12 provides a partial closure for the cavity 26 in the main body section 14. Inlet port section 12 includes an externally threaded inlet port 16; main body section 14 includes an externally threaded outlet port 18. The main body section 14 includes a plurality of threaded studs 20, extending axially from around the periphery. Inlet section 12 includes a plurality of openings 22 formed in the periphery. Openings 22 are adapted to fit over the threaded studs 20. Wing nuts 24 are provided for engaging the threaded studs 20 and pulling housing sections 12 and 14 snugly together. Cavity 26 is formed within the main housing section 14. Disposed within cavity 26 is cage 40 formed from two cage portions 42 and 44. The two cage portions 42 and 44 meet at a circumferential parting line 46. Each cage portion, 42, 44 has a semi-circular notch 48 formed therein. When the valve is assembled notches 48 are aligned to form a circular opening through cage 40. Operating stem assembly 50 extends through the semi-circular notches 48. Main body portion 14 has a circular opening 15 formed in the wall thereof through which stem 50 extends.

Disposed within plastic cage 40 is ball 13 formed from a suitable material such as 316 stainless steel. Ball 13 preferably has a fine surface finish of 32 or better. Ball 13 has a diametrical opening 52 formed therethrough. The inner diameter of opening 52 is the same as the inner diameter of ports 16 and 18. Each cage member 42 and 44 has an opening 43 formed therein which is the same diameter as the opening through ball 13 and the ports 16, 18. The openings 43 are aligned with the ports 16, 18.

The operating stem 50 extends through the radial opening 15 in main body member 14. The opening 15 is beveled on both the inside and outside of main body member 14 into the wall. A conical shoulder 35 is thus formed on the inner diameter of body member 14 and a similar conical shoulder 36 is formed on the outer diameter. The inner end of the operating stem 50 is formed with a flange 38 which when the valve 10 is assembled confronts the annular shoulder 35. An external hexagonal nut 53 engages threads 54 on the operating stem 50 and provides an inwardly facing radial shoulder which confronts the outwardly facing conical shoulder 36.

A plastic sealing ring 56 which may be of the same material as the cage 40 embraces the operating stem 50 between the shoulder 35 and flange 38. A second similar sealing ring 58 embraces the operating stem assembly 50 between the shoulder 36 and nut 53. The nut 53 may be tightened on the operating stem 50 to cooperate with the flange 38 of the operating stem to compress the two sealing rings 56 and 58 under effective sealing pressure with the opening 15 through main body section 14. The two plastic sealing rings 56 and 58 not only serve their primary purpose of sealing, but also serve as a low friction bearing for the operating stem 50.

Any suitable means may be provided to actuate the operating stem, either directly or by remote control. In the disclosed construction an operating handle 60 is removable mounted on the outer end of the operating stem 50. Handle 60 has a hexagon shaped opening 62 formed in its inward facing side. This opening 62 does not extend through handle 60. A square shaped opening 64 is formed on the outward facing side of handle 60 and extends into the hexagon shaped opening 62. The hexagon shaped opening 62 engages the hexagon portion of nut 53 and the square opening 64 engages a square portion of stem 50. Handle 60 thus serves to lock nut 53 and stem 50 together. The threaded portion of stem 50 extends through opening 64 and is engaged by a wing nut 51. Two lugs or projections 61 and 63 are provided extending generally parallel to the openings 62, 64 through handle 60. The lugs 61, 63 are spaced radially from the center of openings 62, 64. When valve 10 is assembled, projections 61 and 63 engage a stop pin 66 which extends from main valve body section 14, to limit rotation. Stop pin 66 and lugs 61 and 63 are sized to limit movement of handle 60 to either 90° or 180° depending on how handle 60 is attached to stem 50 relative to pin 66. If stop 66 is provided beneath handle 60, where the circumferential spacing between lugs 61 and 63 is the smallest, rotational movement of handle 60 is limited to 90°. If stop 66 is located outside of handle 60, where the circumferential spacing between lugs 61 and 63 is the greatest, rotational movement of handle 60 is limited to 180°. Handle 60 is thus adaptable to be used on valves which require either a 90° movement or a 180° movement for operation.

Note that the screw threads on operating stem 50 are outside of the valve body, with no possibility of contact between the screw threads and the material that flows through the valve. As pointed out above handle 60 engages hexagonal nut 53 to keep nut 53 from rotating relative to the handle. Since the handle 60, by virtue of its square aperture 64, interlocks with the operating stem 50, it is apparent that the handle 60 serves in effect as a means of interlocking the hexagonal nut 53 and the operating stem 50 to prevent rotation of nut relative to the operating stem.

Ball 13 has a slot 72 extending parallel to opening 52 formed therein. Slot 72 is engaged by a shoulder 74 which extends from flange 38. This serves to rotate ball 13 as handle 60 is rotated. Valve 10 is constructed to place plastic cage 40, consisting of members 42 and 44, under longitudinal compression. Valve body members 12, 14 and cage members 42, 44 are constructed so that the longitudinal compression of the cage 40 results in a relatively high unit sealing pressure of the cage members 42, 44 radially inward against the periphery of ball 13. The high sealing pressure is provided in end zones which are in proximity to the inner ends of port openings 16, 18. The cage members 42, 44 are formed with annular flange portions 80, 82 respectively, which are engaged by mating annular portions 81, 83 formed on the valve body members 12, 14. Annular portions 80, 81 and 82, 83 lie in planes perpendicular to the longitudinal flow axis through valve 10. Inclined shoulders 84 and 86 extend from the annular portions 80 and 82. Mating inclined portions 85 and 87 are formed in the valve body cavity. An O-ring 90 is provided near the outer end of inclined shoulder 84. O-ring 90 not only forms a seal between the valve body and the cage 40, but also forms a seal between the valve body sections 12 and 14. The O-ring 90 remains fully confined even when valve 10 is removed from the line. O-ring 90 is confined until valve 10 is dismantled. This feature is especially important where the valve is taken to a remote location for cleaning. Thus tightening the wing nuts 24 not only serves to contract the valve body longitudinally for the purpose of compressing cage members 42 and 44 but also serve to compress O-ring 90. A valve thus constructed has a relatively small outside diameter relative to the diameter of the flow passage.

Figure 1:
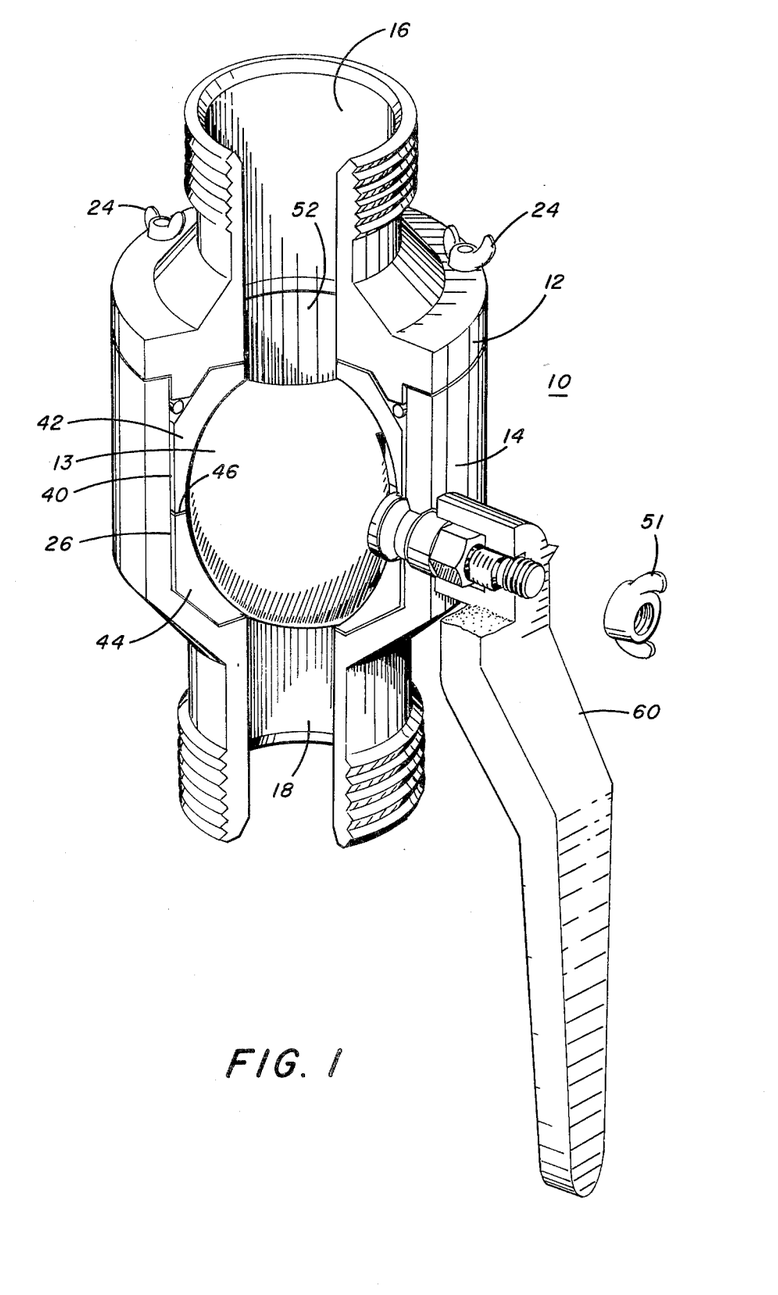
FIG. 1 is an isometric view, with portions cut away, of a ball valve utilizing the teaching of the present invention.
Figure 2:
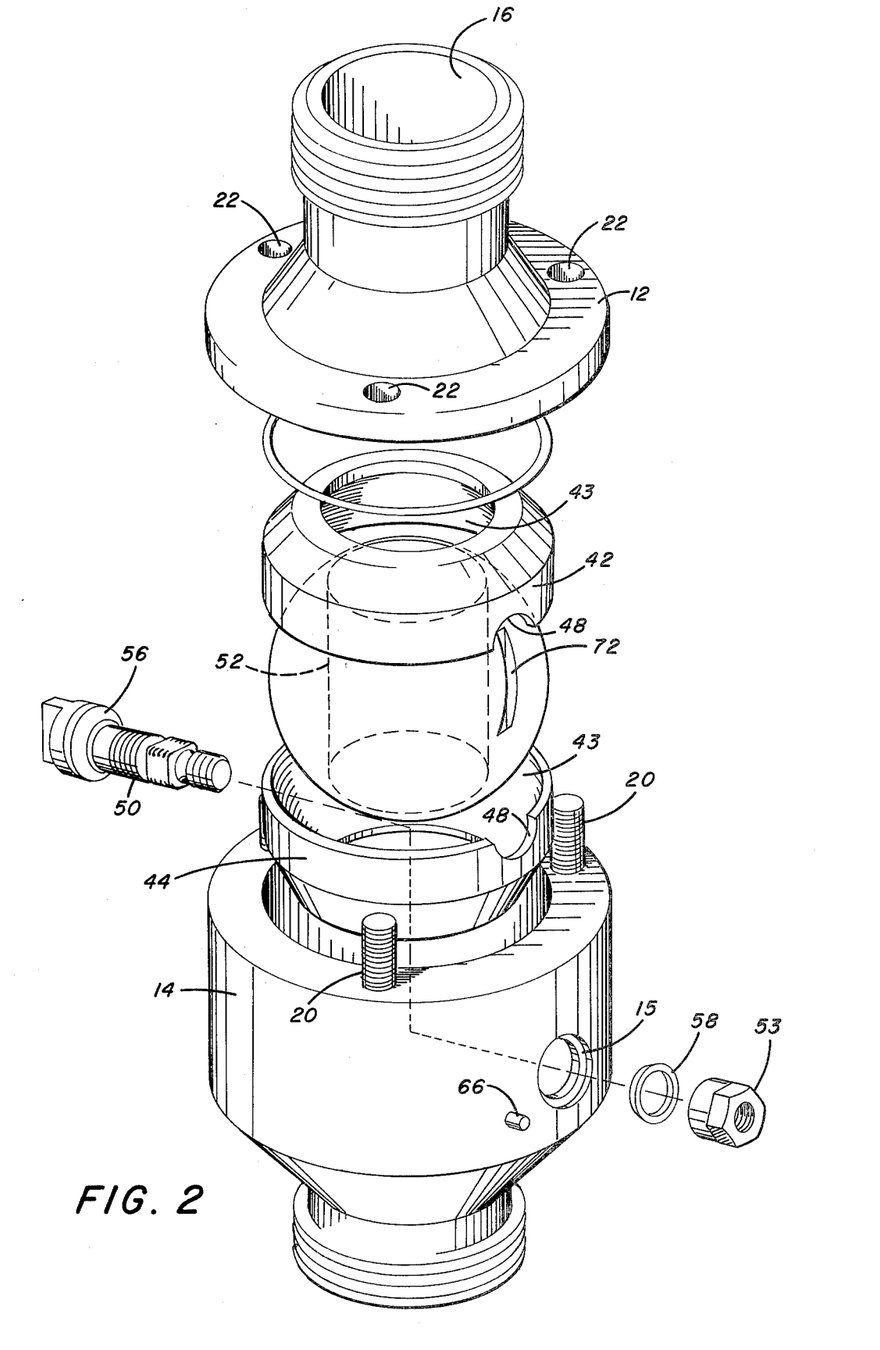
FIG. 2 is an exploded view of the ball valve shown in FIG. 1.
Figure 3:
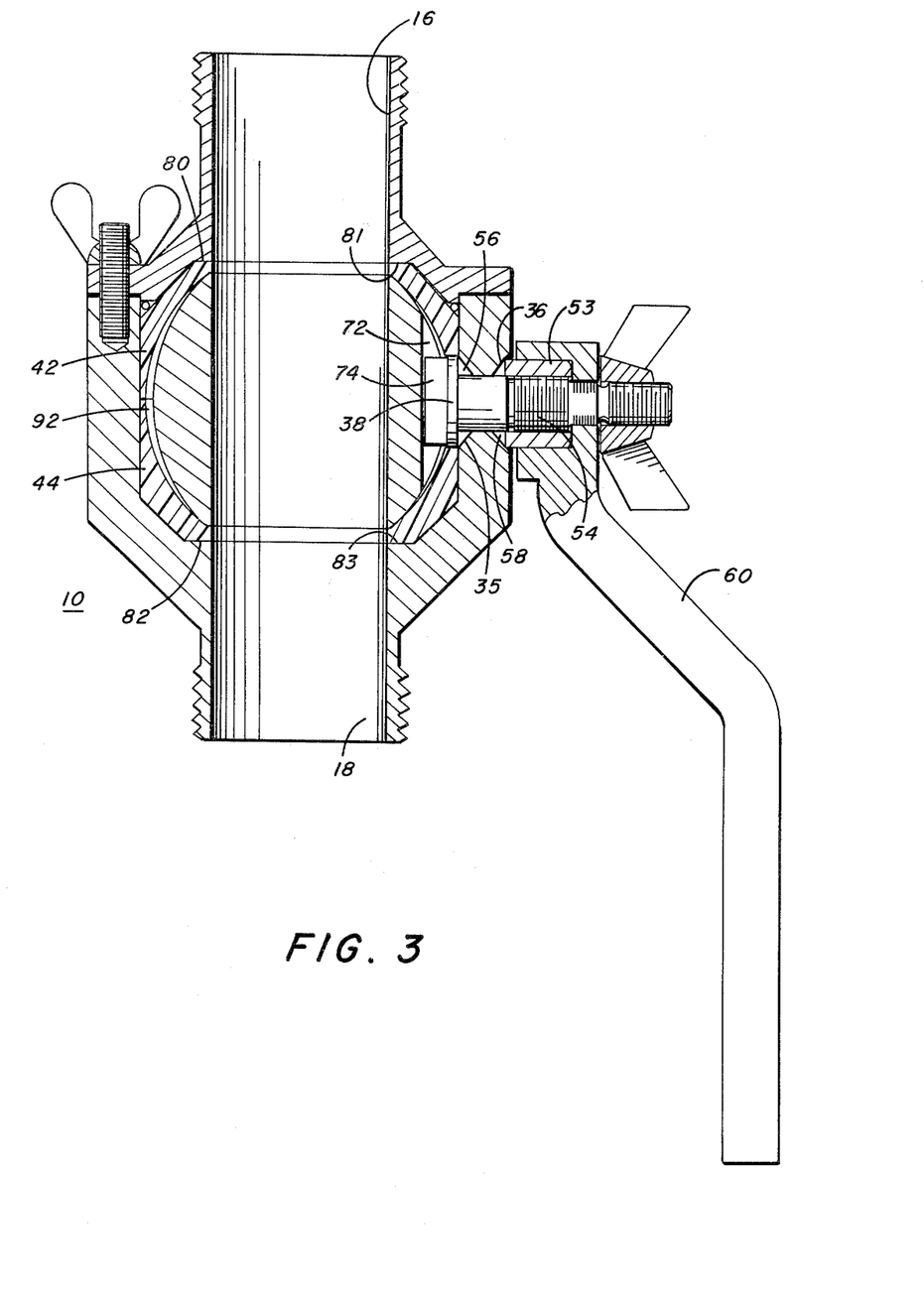
FIG. 3 is a longitudinal section view of the ball valve shown in FIG. 1 in the open position.
Figure 4:
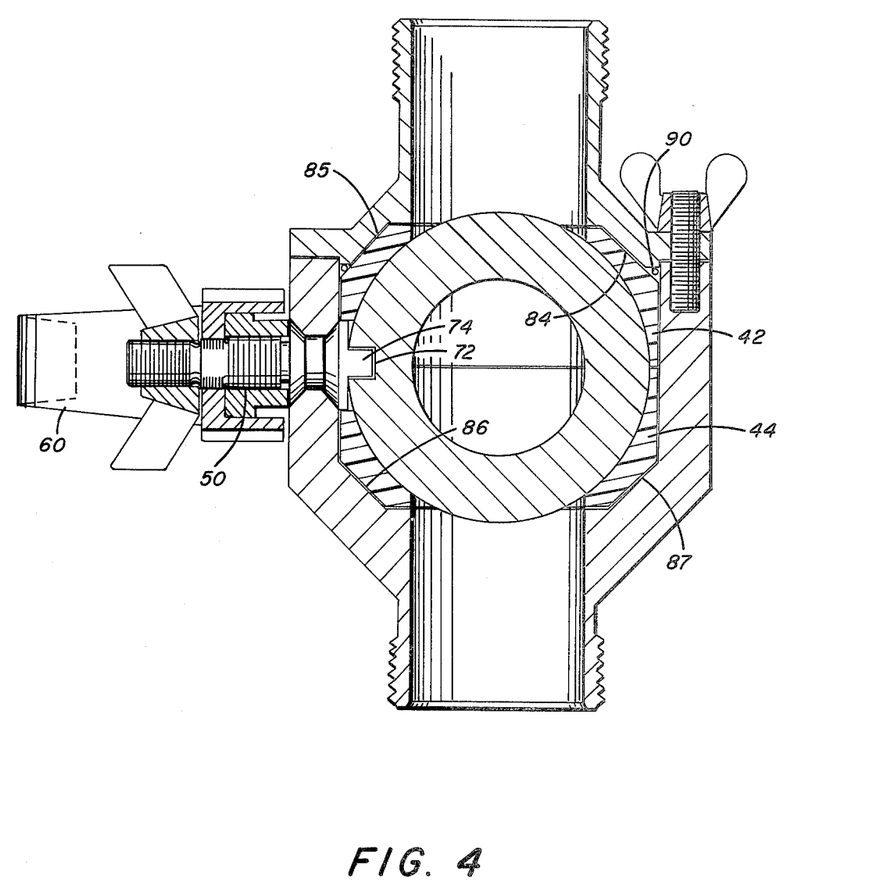
FIG. 4 is a view of the ball valve shown in FIG. 5 along the line IV—IV.
Figure 5:
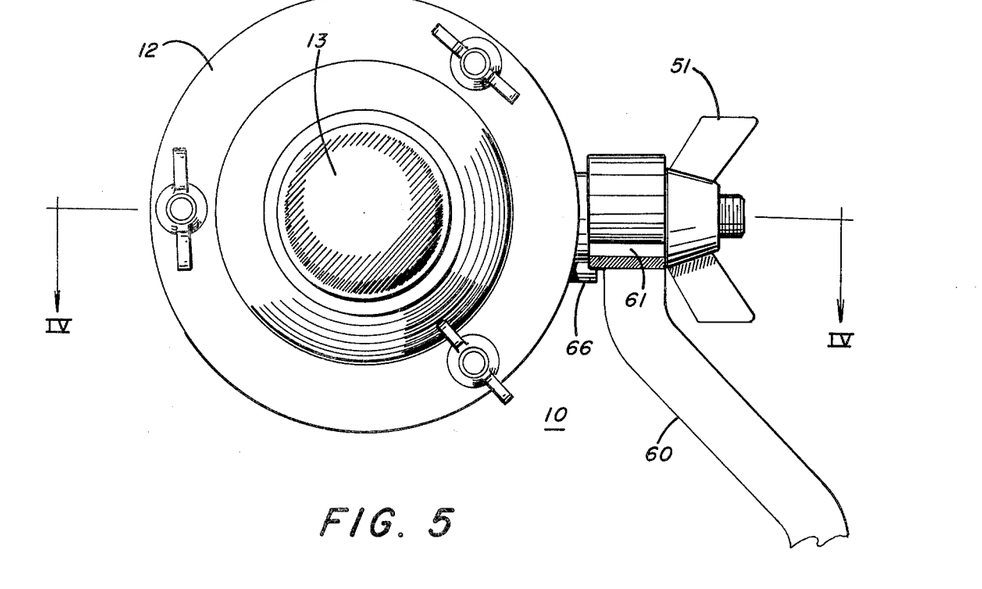
FIG. 5 is a view of the ball valve shown in FIG. 1 in the closed position.
Figure 6:
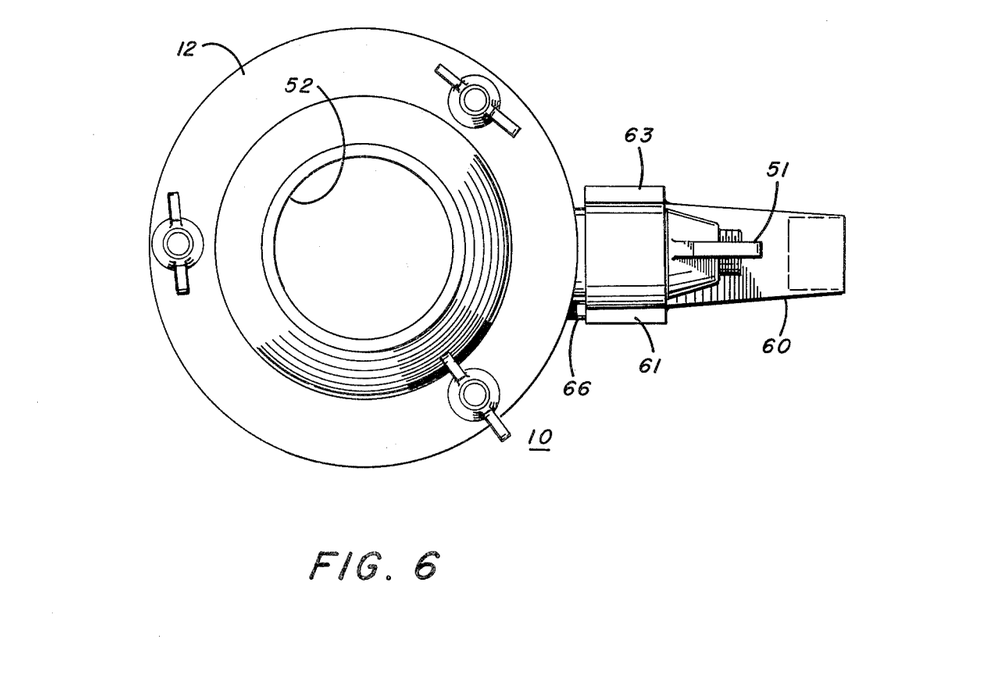
FIG. 6 is a view similar to FIG. 5 but with the ball valve in the open position.
Figure 7:
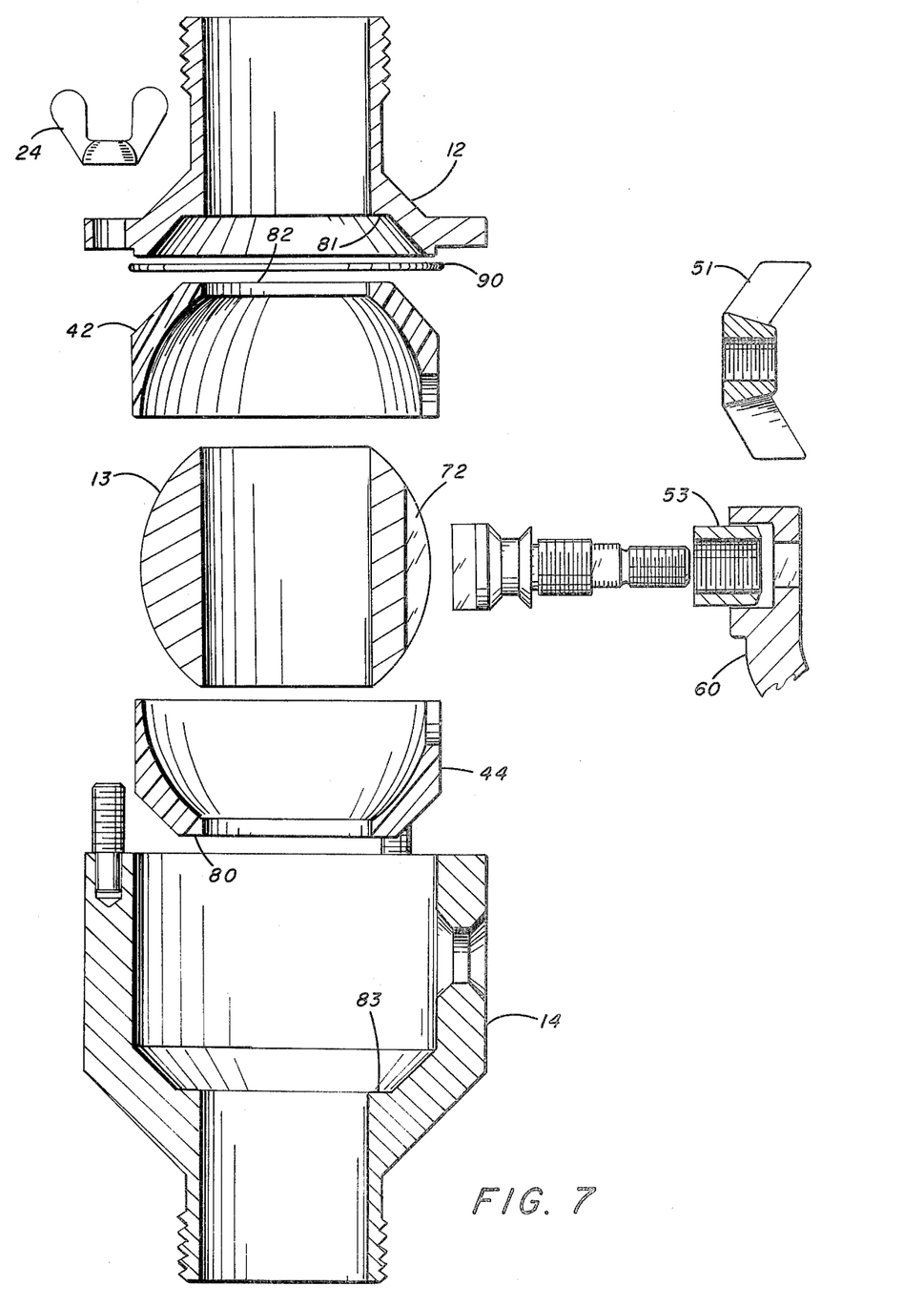
FIG. 7 is a view of a partially disassembled ball valve with portions shown in sections.

When the valve 10 is assembled, the cage members 42, 44 engage the ball 13 near the inner ends of port openings 16, 18. While in the area around contact line 46, where the two cage members 42, 44 engage there is low pressure engagement or no engagement between the cage 40 and the ball 13. A void 92, shown in FIG. 3, may exist in this area.

Constructing the cage members 42, 43 with the annular surfaces 80, 82 permits the cage to be easily compressed longitudinally and provides a valve having no voids or openings, from the flow passage therethrough. Providing fasteners as shown permits a valve of a small outside diameter to be constructed. A relatively small outside diameter is especially important in a valve which is used for inline service where there may be several parallel closely spaced piping runs. The O-ring 90 is fully confined when the valve 10 is removed from the associated piping run. After loosening and removing the three wing nuts, 24 the inside of the valve 10 can be easily disassembled by sliding out the cage 40 and ball 13. After loosening the handle wing nut 51 and removing the hexagonal nut 52 from the operating stem 50 the valve can be completely disassembled. All of the parts of the valve that are exposed to material flow fit snugly together at their junction to avoid forming any internal crevices for entrapment of conveyed material.

Referring now to FIGS. 9 through 12, there is shown a three way tee valve 110 according to the invention. Construction of a three way valve 110 is generally similar to the construction of two way valve 10 and only significant differences will be explained in detail. Three way valve 110 includes a first end port 116, a second end port 118, and a side port 120. Valve 110 includes an operating handle 60 which is the same as operating handle 60 utilized on two way valve 10.

Valve 110 is formed with an end section 112 and a main body section 114. Side port 120 is formed into main body section 114. A ball 113 having three openings formed therein is disposed within valve 110. Ball 113 has a slot formed therein, which is similar to slot 72 formed in ball 13 used for this two way valve 10. An operating stem 50, which is the same construction as operating stem 50 used on valve 10, engages the slot formed in ball 113. A stop pin 166 is formed on the main body section 114. When valve 110 is assembled, stop pin 166 is disposed outside of handle 60, circumferentially between lugs 61, 63. The rotation of the operating handle 60 on valve 110 is thus limited to 180°. This can be contrasted with the two way valve 10 where handle 60 was movable through a 90° rotation.

Figures 8, 11:
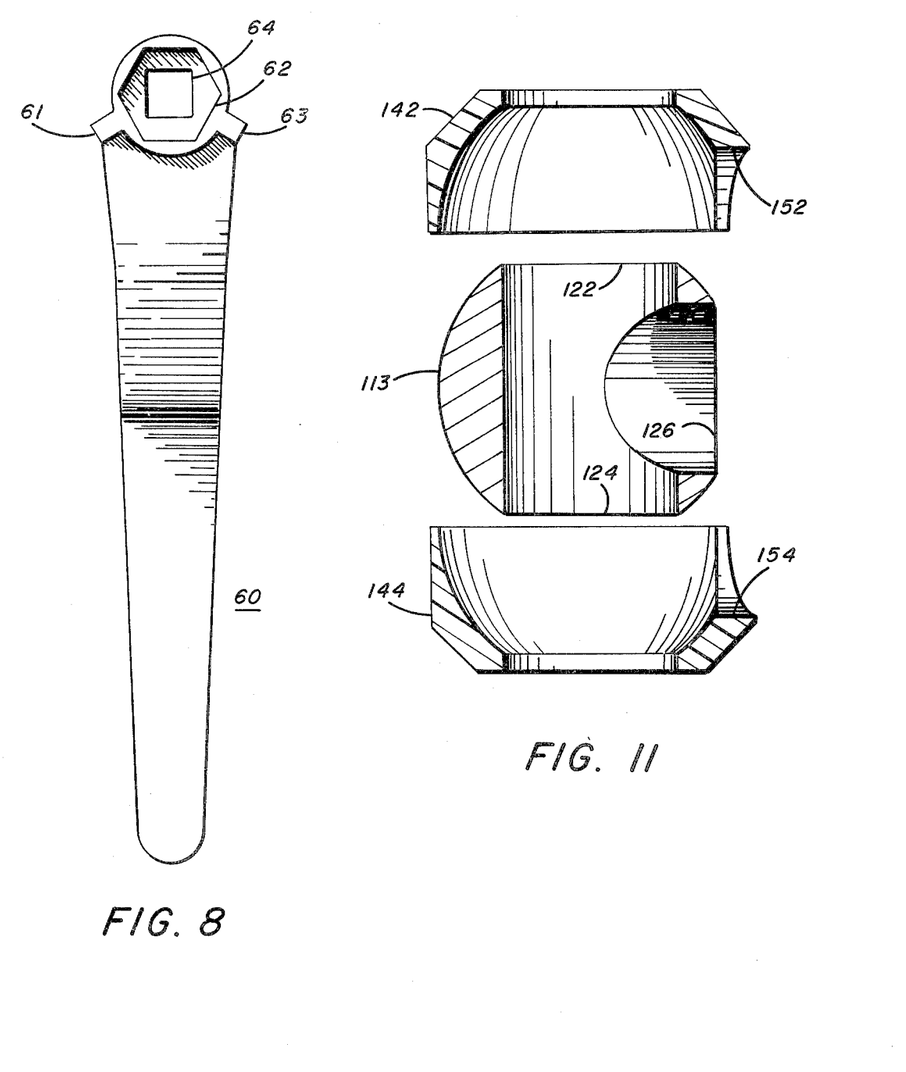
FIG. 8 is a view of the operating handle utilized on the disclosed ball valve.
FIG. 11 is an exploded section view of the cage and ball of a three way tee valve; and, FIG. 12 is a side view of a three way tee valve showing the handle and stop positioned for 180° travel.
Figure 9:
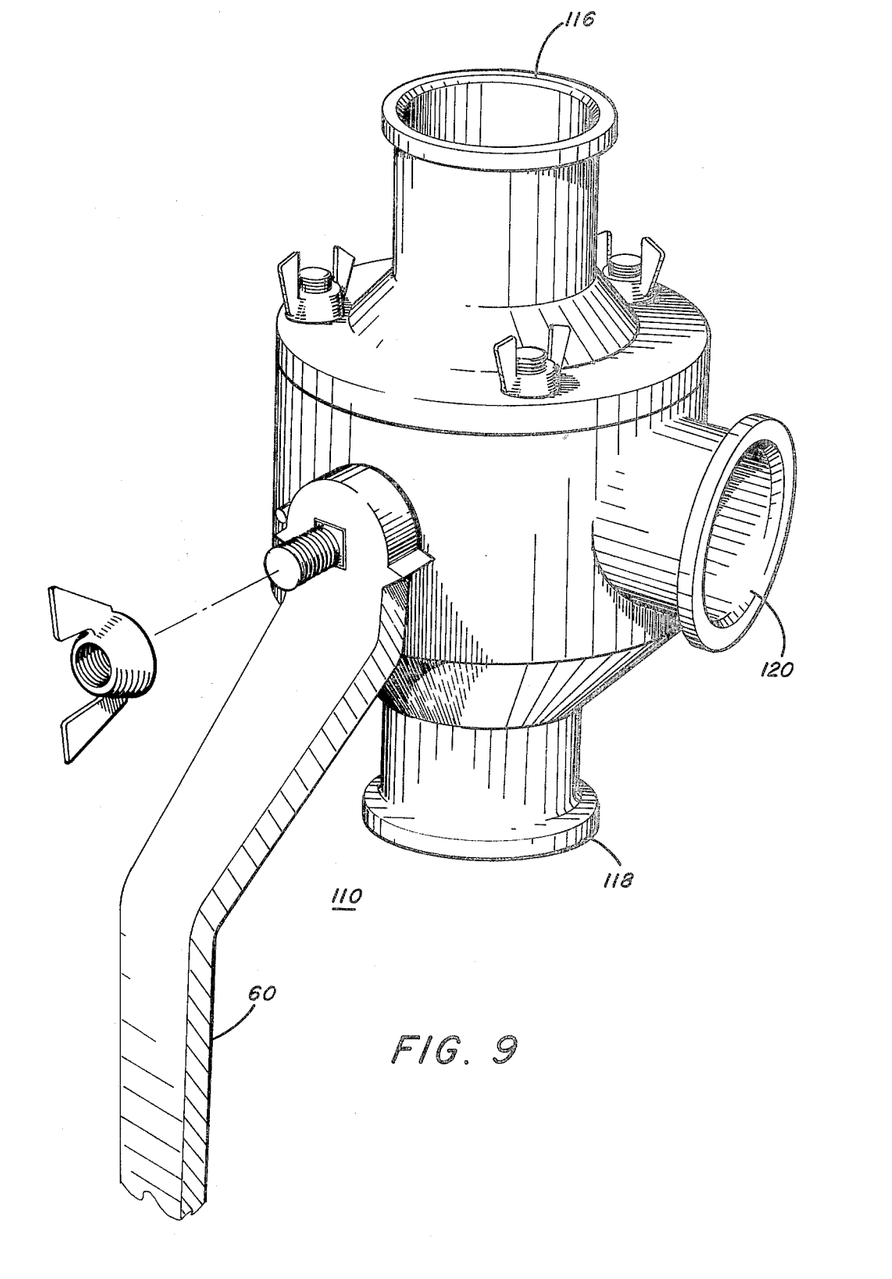
FIG. 9 is an isometric view of a three way tee valve constructed according to the teaching of the disclosed invention.
Figure 10:
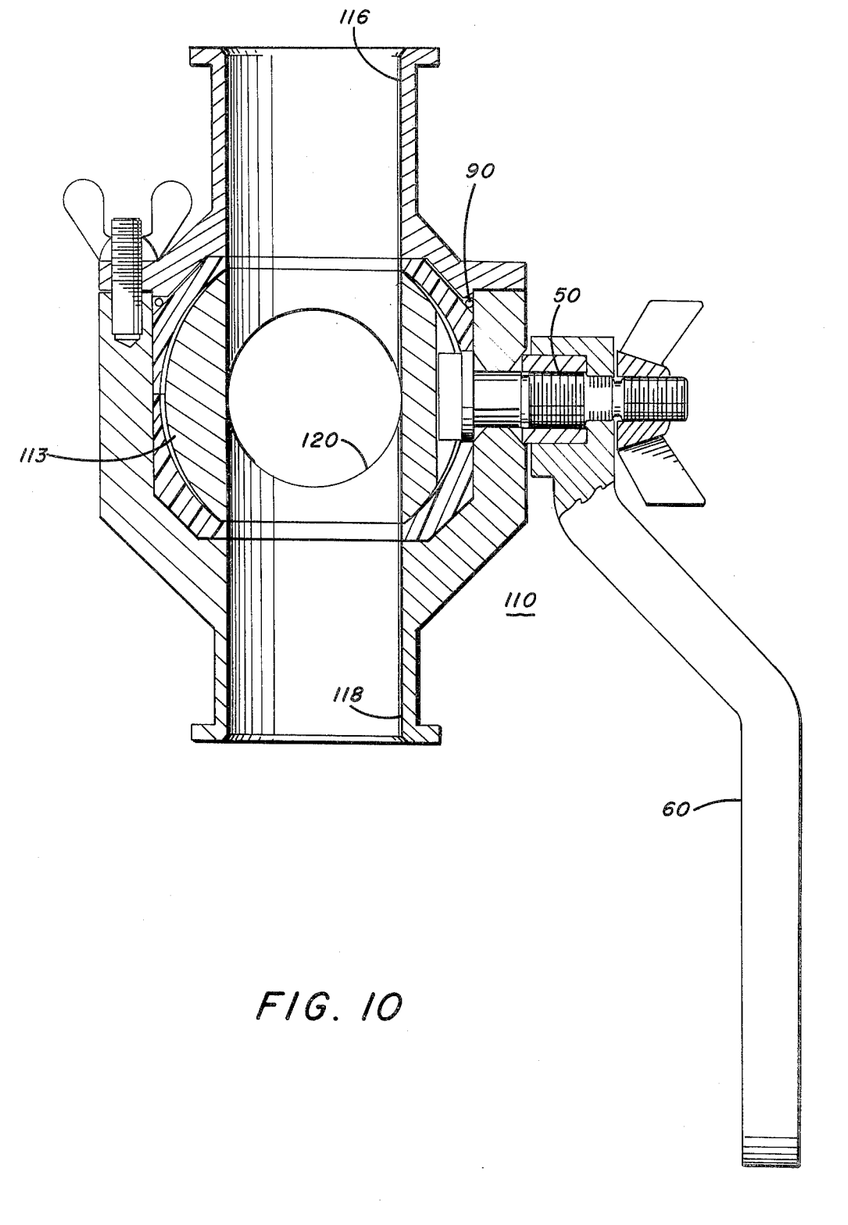
FIG. 10 is a section view of the valve shown in FIG. 9.
Figure 12:
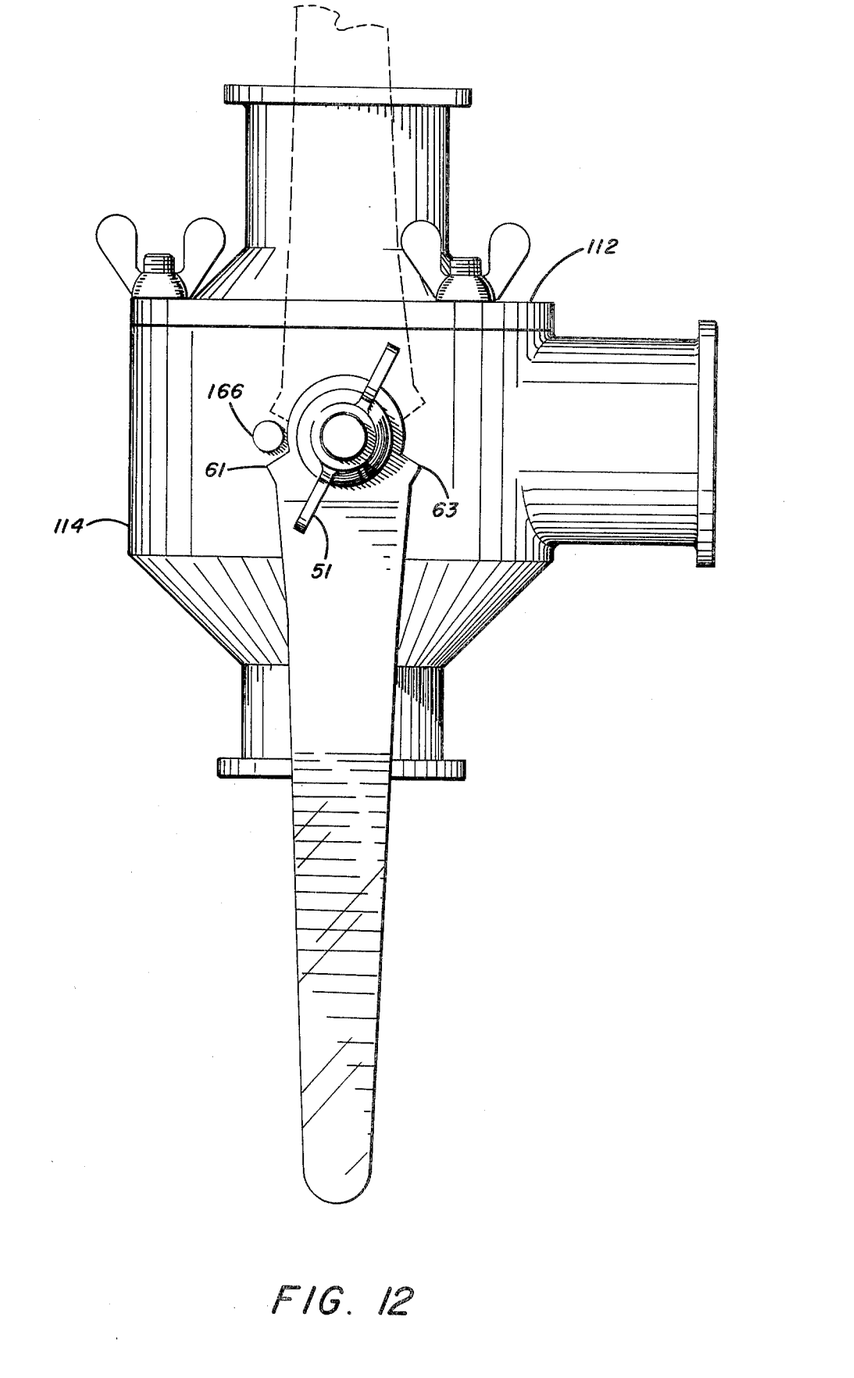

As can best be seen in FIG. 11, ball 113 includes three openings 122, 124, 126 which extend into a passage formed therein. The openings 122, 124, 126 are alignable with ports 116, 118, 120 respectively. Ball 113 is rotatable through 180° so that port 120 can be closed. Disposed within valve 110 is a cage formed from two parts 142, 144. Cage 142 has a semi-circular cutout 152 formed therein. Cage 144 has a semi-circular cutout 154 formed therein. When valve 110 is assembled, cutouts 152, 154 are aligned to define a circular opening aligned with port 120. When ball 113 is positioned with opening 126 aligned with port 120, the cage around the opening defined by cutouts 152, 154 fits snugly between ball 113 and main body section 114. Thus, no voids are formed in valve 110. Cage members 142, 144 also define a smaller circular opening for stem 50. Valve 110 is easy to assemble and disassemble, has relatively few parts, and has no internal voids. Valve 110 is suitable for use where very sanitary conditions must be maintained.

What is claimed is:

1. A three way ball valve comprising:
   a valve body having a pair of axially aligned ports and a third port extending perpendicular to the pair of axially aligned ports;
   a ball, with a passage having three openings formed therein, positionable with respect to the valve body so that the three openings are aligned with the three ports;
   a cage formed of a plastic material, confined in the valve body around the ball with openings aligned with the ports in the valve body and being in high pressure contact with the ball in an area proximate to the pair of axially aligned ports;
   an operating stem for the ball extending radially therefrom through a radial opening in the cage and through a corresponding radial opening in the valve body;
   a handle connected to said operating stem exteriorally of said valve body for rotating said operating stem to position said ball, said handle having a pair of spaced projections with oppositely arranged engaging surfaces; and,
   stop means comprising at least one upstanding element, disposed on the exterior of said valve body for contacting said engaging surfaces of said projections on said handle to limit rotation of said handle;
   said handle being formed so that when said stop means is positioned between the closest adjacent engaging surfaces of said projections, rotation is limited to 90°, and when said stop means is positioned between the other of said engaging surfaces of said projections, rotation is limited to 180°.

2. A three way ball valve as claimed in claim 1 wherein:
   said cage is formed in two pieces each having an opening formed therein surrounded by a flat annular surface disposed in a plane perpendicular to the pair of axially aligned ports;
   said valve body is formed in two pieces with each piece having a flat annular surface which mates with one of the flat annular surfaces of said two piece cage and each having one of said pair of axially aligned ports formed integral therewith; and,
   fastening means for fastening the two pieces of said valve body together to force said cage into engagement with said ball.

3. A ball valve having a longitudinal flow passage extending therethrough comprising:
   a ball having a bore formed therethrough;
   a pair of cage members disposed around said ball, each having a hole formed therein with a flat annular surface, disposed perpendicular to the flow passage, formed around the hole;
   a two-piece housing disposed around said pair of cage members with each housing piece having a flat annular surface which mates with one of the flat annular surfaces of said pair of cage members and each having a port extending therethrough which is aligned with the hole in the associated cage member;
   fastening means for fastening said two piece housing together to pull the annular housing surfaces towards each other compressing the pair of cage members and forcing them into high pressure engagement with said ball in proximity to the annular areas;
   an operating stem engaging said ball and extending external to said housing;
   a stop pin located on the outside of said housing;
   a handle engaging said operating stem and having a pair of circumferentially spaced apart projections formed around the portion of the handle which engages said operating stem, each said projection having opposed portions for engaging said stop pin; and,
   said projections spaced apart so when said stop pin is disposed between the closest spaced portions of said projections, the rotation of the handle is limited to 90° and when said stop pin is disposed between the other portions of the projections, the rotation of the handle is limited to 180°.

4. A ball valve as claimed in claim 3 wherein:
   each cage member has a shoulder portion formed extending at an angle from the flat annular surface;
   said two-piece housing includes a cap section having a shoulder portion which mates with the shoulder portion of one of said pair of cage members and a main body section having a shoulder portion which mates with the shoulder portion of the other cage member; and,
   an O-ring disposed around the angled shoulder portion of the cage member which is engaged by the cap section in a sealing relationship with one of said pair of cage members, said main body section, and said cap section.

5. A ball valve as claimed in claim 3 wherein:
   said ball includes a side bore which extends into the bore formed therethrough;
   said pair of cage members have a side hole formed therein extending perpendicular to the longitudinal flow passage; and,
   said two piece housing includes a side port aligned with the side hole formed in said pair of cage members.

6. A ball valve comprising:
   a housing having a cavity formed therein with a pair of aligned longitudinal passages extending along a longitudinal axis from the cavity and with each passage having an externally connecting end portion formed at the outer end of the passage;
   a cage disposed in said cavity having a spherical shaped cavity formed therein with openings into the spherical shaped cavity aligned with the passages through said housing;
   a ball having a diametrical bore formed therethrough disposed in said cage for rotational movement between an open position, wherein the diametrical opening is aligned with the passage through said housing, and a closed position wherein the diametrical openings extend traverse to the longitudinal passage through said housing;

a pair of cage annular surfaces, formed on said cage, each disposed radially outward around the outside of one of the openings in said cage;

a mating pair of housing annular surfaces formed on the inside of the cavity in said housing to mate with the pair of cage annular surfaces;

fastening means for securing said housing and forcing said pair of housing annular surfaces toward each other into engagement with said pair of cage annular surfaces to force said cage, in proximity to the openings therein into high pressure engagement with said ball;

an operating stem extending through said housing and into engagement with said ball;

an operating handle disposed external to said housing for rotating said operating stem to move said ball between an open and closed position, said handle having at least a pair of spaced projections with oppositely arranged engaging surfaces;

stop means comprising at least one upstanding element, disposed on the outer surface of said operating housing for contacting said engaging surfaces of said projections on said handle to limit rotation of said handle; and, said operating handle is formed so when said stop means is positioned between the closest adjacent engaging surfaces of said respective projections rotation is limited to 90° and when the handle is positioned with the stop means between the other of said engaging surfaces of said projections rotation is limited to 180°.

7. A ball valve as claimed in claim 6 wherein:

said housing is formed from two parts, a main body section and an inlet end section which has a plurality of holes formed around the periphery;

a plurality of threaded studs projecting from said main body section and extending through the plurality of openings formed in said inlet end section; and, a plurality of wing nuts to engage said studs and force said housing together.

* * * * *